Figure 1:
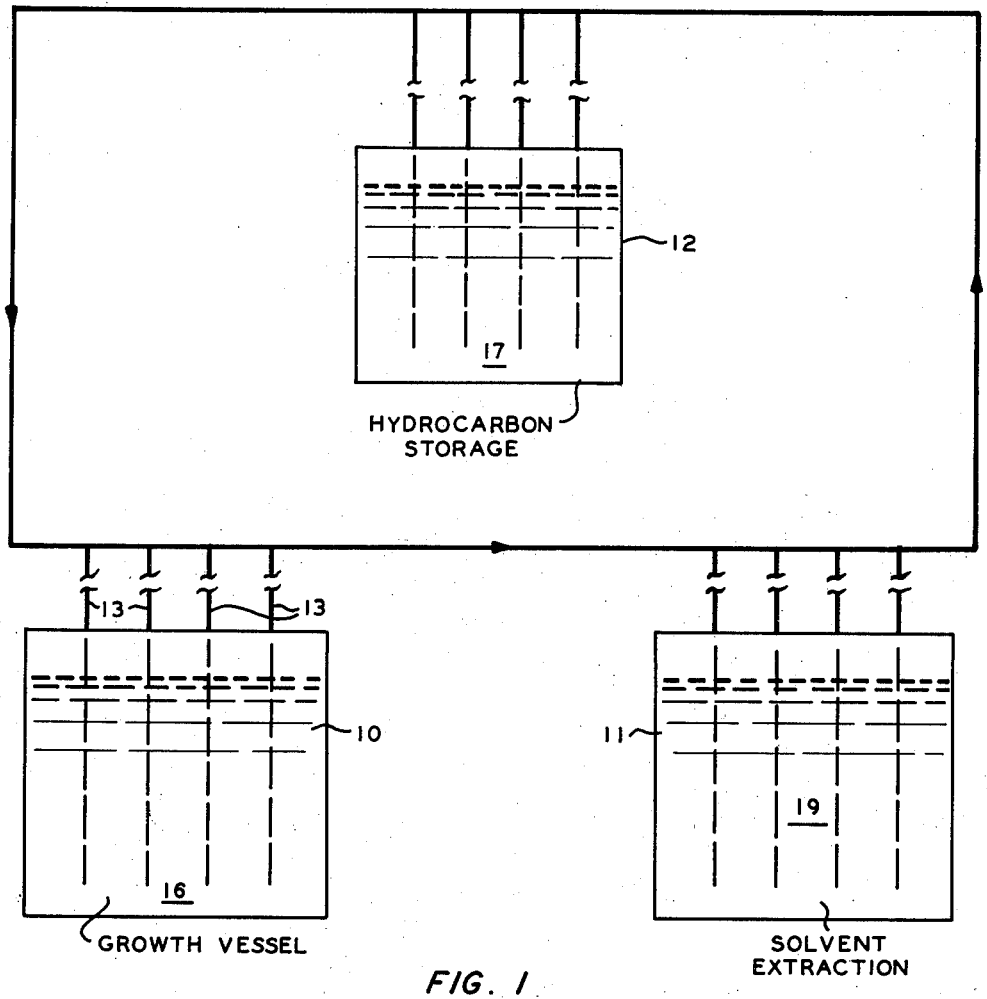

Oct. 19, 1965 D. O. HITZMAN 3,212,993
HYDROCARBON FERMENTATION PROCESS
Filed July 26, 1963

INVENTOR.
D.O. HITZMAN
BY *Young & Quigg*
ATTORNEYS 3,212,993
HYDROCARBON FERMENTATION PROCESS
Donald O. Hitzman, Bartlesville, Okla., assignor to
Phillips Petroleum Company
Filed July 26, 1963, Ser. No. 297,886
3 Claims. (Cl. 195—28)

This invention relates to the fermentation of hydrocarbons. In another aspect, this invention relates to an improved hydrocarbon fermentation process wherein the hydrocarbon-water interfacial area is increased.

A problem associated with the fermentation of hydrocarbons by microorganisms is the difficulty of providing sufficient hydrocarbon surface for attack by the organisms. As the organisms live in the aqueous phase, in which the hydrocarbon is insoluble, the attack on the hydrocarbon is limited to the hydrocarbon-water interface. When liquid and solid hydrocarbons are employed, the liquid or solid hydrocarbon is substantially immiscible with the aqueous phase and therefore remains separated from the aqueous phase in a separate hydrocarbon phase.

Accordingly, an object of my invention is to provide an improved hydrocarbon fermentation process and apparatus therefor.

Another object of my invention is to provide a hydrocarbon fermentation process and apparatus therefor wherein the hydrocarbon-water interfacial area is increased.

Other objects, advantages and features of my invention will be readily apparent to those skilled in the art from the following description, drawing and appended claims.

In accordance with my invention, the fermentation of hydrocarbons is promoted by maintaining the liquid or solid hydrocarbon within the aqueous phase. Preferably, although not to be limited thereto, the hydrocarbon is supported on an inert metal or plastic screen or net. The screen or net is first immersed in the molten or liquid hydrocarbon material, the said hydrocarbon material filling the void space with a thin film. The support and adhering hydrocarbon film are then immersed in the aqueous fermentation system and maintained therein, the film presenting a large surface area for attack by the microorganisms. The hydrocarbon remains on the support until it has been removed by microbial action.

Hydrocarbons which can be employed are those which are liquid or solid at the immersion and fermentation temperatures. When a solid hydrocarbon (e.g., naphthalene) is employed, preferably the hydrocarbon is heated to the molten state, and the support immersed in the resulting liquid. Upon removal of the support, the adhering liquid hydrocarbon cools to form a thin film of solid available for microbial attack. Multiple support screens or nets can be employed in a single hydrocarbon fermentation zone. The supporting screens or nets can be introduced into and removed from the hydrocarbon fermentation zone at any time during the fermentation process. The film-laden support does not require replacement with a freshly hydrocarbon-coated support until disappearance of the film. Therefore, it is possible to visually control the utilization of the hydrocarbon.

It is within the scope of this invention to employ hydrocarbons normally toxic to the microorganisms by maintaining the concentration of the toxic hydrocarbons within the range acceptable to the microorganisms.

Microorganisms employed in the fermentation of hydrocarbons are those which utilize hydrocarbons as a nutrient material and include yeasts, molds, algae and bacteria. Suitable microorganisms include bacteria classified as Eubacteriales, Actinomycetales, Chlamydobacteriales, Myxobacteriales and Spirochaetales. These microorganisms are cultured in various mixtures of mineral salts dissolved in water with the hydrocarbon as the sole carbon source. Generally, a suitable medium should have (a) a balanced mineral content, (b) a nitrogen source such as ammonium or nitrate ions, (c) oxygen and (d) a pH near neutrality. Exceptions are known to each of these conditions. For example, oxygen is not required in the growth and development of many hydrocarbon-utilizing organisms. For a more complete discussion of suitable conventional aqueous media that can be employed in the fermentation of hydrocarbons, reference is made to Petroleum Microbiology by Beerstecher, Elsevier Press, Inc., 1954.

Temperatures employed within the fermentation zone are those normally employed in the growth of the particular microorganism selected for the fermentation process and generally range from about 20° C. to about 50° C.

The hydrocarbons employed in the hydrocarbon fermentation process are converted to products such as alcohols, aldehydes, acids and ketones. These products can be removed from the hydrocarbon phase by fractionation, solvent extraction, and other well-known methods of separation. Products produced by the hydrocarbon fermentation process which are miscible with water can be separated from the aqueous phase by fractionation and other well-known methods of separation.

Figures 2, 3:
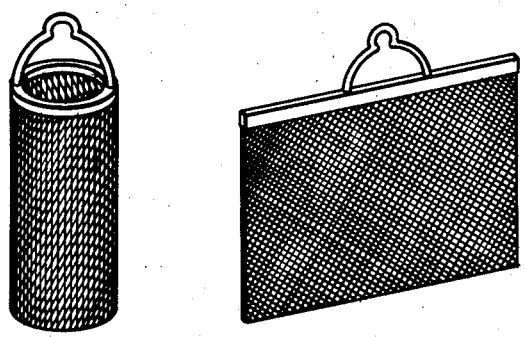

In the drawings:
FIGURE 1 is a schematic representation of one embodiment of the invention.
FIGURE 2 is illustrative of one embodiment of a suitable screen or net.
FIGURE 3 is a second embodiment of a suitable screen or net.

A more complete understanding of the invention can be made by reference to the drawing and the following description. It is not intended that the invention should be limited thereto. Growth vessel 10 contains an aqueous medium 16, said aqueous medium containing hydrocarbon-utilizing microorganisms. Screens 13, such as those illustrated in FIGURES 2 and 3, containing a liquid or solid hydrocarbon, are immersed within the aqueous medium contained within growth vessel 16. Although not to be limited thereto, it is preferred that the hydrocarbon support provide a maximum hydrocarbon-aqueous interface area per hydrocarbon unit weight. It has been discovered that screens or nets provide large hydrocarbon-aqueous interfacial contact areas and are therefore generally preferred.

After at least a portion of the hydrocarbons immersed within the aqueous phase have been converted by action of the microorganisms, the screens containing the converted hydrocarbons can be withdrawn from growth vessel 16 and passed to a solvent extraction vessel 11 containing a suitable selective solvent 19 for the converted hydrocarbons. The converted hydrocarbons are separated from the support by the selective solvent within solvent extraction vessel 11.

The supports are then withdrawn and passed to a hydrocarbon storage vessel 12 containing a hydrocarbon 17 to be converted by action of the microorganisms. Hydrocarbon 17 can be a normally liquid hydrocarbon or it can be a normally solid hydrocargon maintained within the molten state within hydrocarbon storage vessel 12. If the hydrocarbon within storage vessel 12 is in the molten state, as the supports are withdrawn from storage vessel 12, the hydrocarbon solidifies, forming a thin film over the support. The supports can then be passed from hydrocarbon storage vessel 12 to growth vessel 10 and again immersed in the aqueous medium 16.

The hydrocarbon fermentation process illustrated in FIGURE 1 can be operated as a continuous process or a batch process. When operating as a continuous process, hydrocarbon supports are simultaneously positioned within growth vessel 10, solvent extraction vessel 11, and hydrocarbon storage vessel 12. As a hydrocarbon support is removed from growth vessel 10, it is replaced by a support from hydrocarbon storage vessel 12.

FIGURES 2 and 3 illustrate two preferred hydrocarbon supports. It is within the scope of this invention to employ other hydrocarbon support materials such as porous solid particles having a density greater than the density of the aqueous medium, said porous solid particles providing high hydrocarbon-aqueous interfacial surface area.

The following examples are presented as illustrative of the effectiveness of the medium.

*Example I*

A culture of *Pseudomonas flourescens* in 500 ml. of an aqueous salt solution is permitted to grow in the presence of air on 5 grams of n-hexadecane at 37° C. for a period of three days. The aqueous mineral salt solution contains 2.0 grams per liter of $KH_2PO_4$, 4.0 grams per liter of $K_2HPO_4$, 0.2 gram per liter $MgSO_4 \cdot 7H_2O$, 0.001 gram per liter $MnCl_2 \cdot 4H_2O$, 0.005 gram per liter $FeSO_4 \cdot 7H_2O$, 0.1 gram per liter $CaCl_2$, and 1.0 gram per liter $NH_4SO_4$. The hexadecane is made available to the microorganisms by placing in the mineral salt solution a film of hydrocarbon adhering to a series of ten stainless steel screens having a total surface area of 50 square inches. At the end of the three-day fermentation period 3 grams of n-hexadecane remains on the screens, showing that about 2 grams of the hydrocarbon is consumed by the microorganisms.

*Example II*

Five grams of n-hexadecane is poured on the surface of another 500 ml. portion of the same aqueous mineral salt solution employed in Example I, and fermentation by the same microorganisms employed in Example I is permitted to proceed at 37° C. for three days in the presence of air. As no screens are employed, the hydrocarbon-water interfacial area is only 5 square inches. After three days of fermentation, the unreacted hexadecane weighs 4.8 grams, indicating that only 0.2 gram of hydrocarbon is converted by the microorganisms.

It is readily apparent that by increasing the hydrocarbon-aqueous interfacial area that fermentation of hydrocarbons is substantially increased.

Various modifications of this invention can be made, or followed, in the light of the foregoing disclosure, without departing from the spirit or the scope thereof.

I claim:

1. A hydrocarbon fermentation process which comprises placing a hydrocarbon selected from the group consisting of liquid and solid hydrocarbons upon a solid support, said support selected from the group consisting of screens and nets, positioning said support within an aqueous medium containing hydrocarbon-utilizing microorganisms, withdrawing said support from said aqueous medium, and separating the converted hydrocarbons from said support.

2. A hydrocarbon fermentation process which comprises placing a hydrocarbon selected from the group consisting of liquid and solid hydrocarbons upon a solid support, said support selected from the group consisting of nets and screens, positioning said solid support within an aqueous medium containing hydrocarbon-utilizing microorganisms, withdrawing said support from said aqueous medium, and separating converted hydrocarbon products from said aqeous medium.

3. The process of claim 2 wherein said hydrocarbon is hexadecane and said microorganisms comprise *Pseudomonas fluorescens*.

References Cited by the Examiner

UNITED STATES PATENTS

| 1,208,199 | 12/16 | Pennewell | 195—139 X |
| 1,746,316 | 2/30 | Marcus | 195—140 X |

FOREIGN PATENTS

| 490,697 | 2/53 | Canada. |

OTHER REFERENCES

Beerstecher: Petroleum Microbiology, pages 148–150, published by Elsevier Press, 1954.

A. LOUIS MONACELL, *Primary Examiner*.